United States Patent [19]

Seybold

[11] Patent Number: 5,749,139
[45] Date of Patent: May 12, 1998

[54] SYSTEM AND METHOD FOR ASSEMBLING A PART HAVING A BODY AND A COVER HAVING INTERFERENCE FIT RETAINING PINS AND BODY SHAFTS

[75] Inventor: James M. Seybold, Centerville, Ohio

[73] Assignee: NCR Corporation, Dayton, Ohio

[21] Appl. No.: 653,857

[22] Filed: May 28, 1996

[51] Int. Cl.[6] ........................................ B23P 19/02
[52] U.S. Cl. ........................................ 29/525; 29/806
[58] Field of Search ........................ 29/525, 806, 700; 100/295, 211; 72/465

[56] References Cited

U.S. PATENT DOCUMENTS

| | | |
|---|---|---|
| 4,563,725 | 1/1986 | Kirby . |
| 4,861,177 | 8/1989 | Heins et al. . |
| 4,939,613 | 7/1990 | Flores, Jr. et al. . |
| 5,056,940 | 10/1991 | Basile . |
| 5,097,374 | 3/1992 | Koizumi et al. . |
| 5,267,398 | 12/1993 | Hall ........................ 29/525 |
| 5,287,240 | 2/1994 | Koizumi et al. . |
| 5,419,643 | 5/1995 | Matsuura . |

FOREIGN PATENT DOCUMENTS

| | | | |
|---|---|---|---|
| 0076352 | 6/1981 | Japan | .................. 29/525 |
| 6246553 | 9/1994 | Japan | .................. 29/525 |

Primary Examiner—David P. Bryant
Assistant Examiner—Tisa Stewart
Attorney, Agent, or Firm—Charlene Stukenborg

[57] ABSTRACT

A system and method of assembling a part having a body and a cover having interference fit retaining pins and associated body shafts is provided which insures that each retaining pin is fully inserted into its associated body shaft through use of a press plate having deflectable inserts at locations adjacent to the retaining pins.

4 Claims, 3 Drawing Sheets

SYSTEM AND METHOD FOR ASSEMBLING A PART HAVING A BODY AND A COVER HAVING INTERFERENCE FIT RETAINING PINS AND BODY SHAFTS

BACKGROUND OF THE INVENTION

The present invention relates to a system and method for assembling a part having a body and a cover having interference fit retaining pins and mating body shafts (or body holes).

When assembling a part having a body and a cover adjoined by retaining pins and body shafts having an interference fit, optimal functional quality results when each cover retaining pin is fully inserted into each body shaft. This is particularly important for parts such as ribbon cassettes which are used in machines such as printers which have many movable parts. If the cover retaining pins are not fully inserted, the cover may not fit securely on the body causing gaps to occur. A ribbon contained in the body may tend to come out these gaps, causing the ribbon to jam. However, manually assembling and providing force at each retaining pin location to achieve fully inserted retaining pins requires costly labor and is especially undesirable when many retaining pins and body shafts are present.

In many applications, an assembly press with a top flat plate and a bottom flat plate is currently used to finally press the body and cover together. The flat press plates are generally machined and thus are not perfectly flat. Also the bodies and covers to be assembled do not have the exact same height dimension at every location due to manufacturing tolerances and other variations in dimension. These variations may cause some retaining pins to not be fully inserted into the associated mating body shafts when pressure from the press is applied to the part. To achieve fully mated assembled parts, workers are required to manually finish inserting retaining pins that are not fully inserted into the associated mating body shaft.

One method of insuring full insertion is to provide individual adjustable metal screws at each retaining pin location. But considerable time and labor are required to adjust these metal screws to insure full insertion. Additionally, these metal screws do not provide any flexibility as a deflectable insert would.

Another method to insure full insertion can include the use of pneumatic or hydraulic cylinders or other such devices at the location of each retaining pin instead of using a flat press plate over all of the retaining pins of the part to be assembled. However, use of such cylinders or devices would greatly increase the cost of the assembly process and require more complicated controls.

To avoid these undesirable aspects, a system and method for assembling a part having a body and a cover having interference fit retaining pins and body shafts which results in each retaining pin being fully inserted into its associated body shaft is provided. The system and method accommodates minor dimensional differences in both the assembly machine and the parts to be assembled and requires little hardware expense.

SUMMARY OF THE INVENTION

In accordance with the teachings of the present invention, a press plate for an assembly press has deflectable inserts at locations adjacent to the interference fit retaining pins enabling each retaining pin to be fully inserted into its associated mating body shaft.

It is an object of the present invention to provide a system and method of assembling a part having a body and a cover which are adjoined using interference fit retaining pins and body shafts so that each retaining pin is inserted completely regardless of changes in dimension due to manufacturing tolerances.

It is another object of the present invention to provide a system and method for assembling a part having a body and a cover which are adjoined using interference fit retaining pins and body shafts which does not require manual force at retaining pin locations to provide fully inserted retaining pins.

It is yet another object of the present invention to provide an assembled part having optimal functional quality, such as a ribbon cassette for use in a printer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
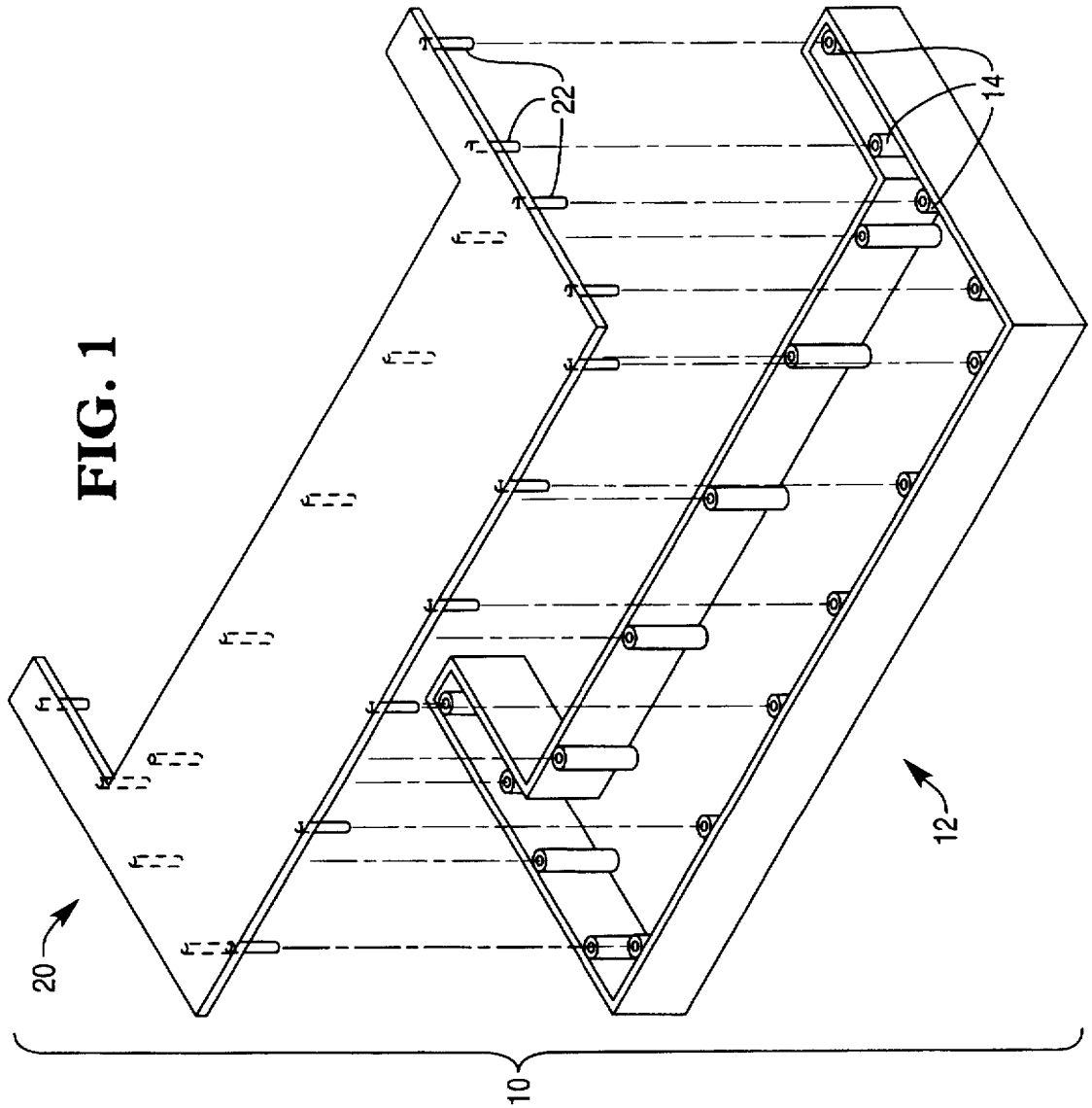
FIG. 1 shows a body and cover having interference fit retaining pins and body shafts which will be assembled according to the present invention.

Referring now to the drawings, in which like-referenced characters indicate corresponding elements throughout the several views, attention is first drawn to FIG. 1 which shows part 10 having a body 12 and a cover 20 having interference fit body shafts 14 (or body holes) and interference fit retaining pins 22. Part 10 may be a ribbon cassette for use in a printer. The body 12 and the cover 20 would be assembled with a ribbon (not shown) inside. Body 12 and cover 20 may be formed or molded from any flexible material such as an TABS plastics or any plastic-type material as is commonly used for making items such as ribbon housings.

Figure 2:
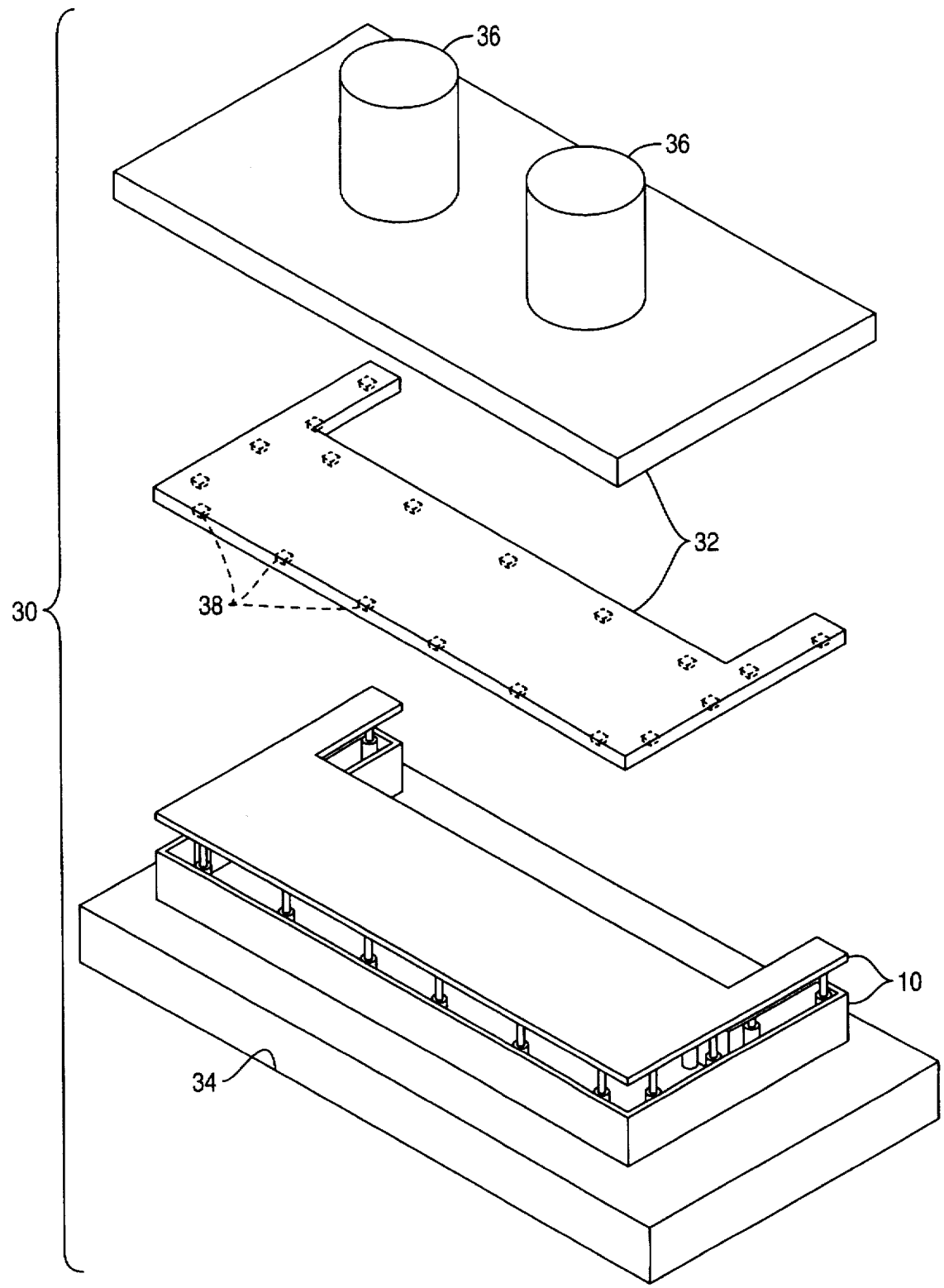
FIG. 2 shows an assembly press, before operation, having deflectable inserts at each retaining pin location for finally assembling the body and cover of FIG. 1 according to the present invention.

FIG. 2 shows the preassembled part 10 placed on an assembly press 30. Before placing the part on the assembly press described below, an operator manually preassembled the cover 20 and the body 12 using slight pressure. The pre assembly process does not provide pressure at each individual retaining pin 22 and does not provide the pressure needed for fully inserted retaining pins 22.

Referring to the assembly press 30 of FIG. 2, the side supports and other standard equipment associated with the assembly press 30 are omitted to more clearly show the present invention. The assembly press 30 can be any standard press which is well-known in the art. Alternatively, the assembly press 30 could be custom-made to fit the part to be assembled. The assembly press 30 may have either hydraulic or pneumatic cylinders 36. The assembly press 30 has a pair of flat plates 32 and 34, preferably metal plates, such as steel or aluminum. Flat plates 32 and 34 are substantially parallel to each other. Flat plate 34 is called the base plate and is the plate that the preassembled part 10 is placed on to have the cover retaining pins 22 fully inserted into the body shafts 14 by the assembly press 30.

Flat plate 32 is the top plate and is attached to the cylinders 36. Flat plate 32 is shaped to provide a flat surface corresponding to each flat surface on cover 20 which has an associated retaining pin 22. Flat plate 32 may be composed of two plates fastened together, with the standard shaped plate attached to the cylinders 36 and the customized plate which has the shape of the part to be assembled attached to the standard shaped plate. Flat plate 32 has deflectable inserts such as small pieces of hard rubber-type material 38 appropriately sized and located at each retaining pin location of the preassembled part 10. For example only, rubber inserts having part number 3MM SE-5018DR from Netherlands Rubber Company in Cincinnati, Ohio and having a height of about ¼ inch and a square base of about ½ inch may be used. Of course any insert having a size to concentrate the assembly press force at the pin locations and having some degree of flexibility without being so flexible as to not apply the needed force to the pin for full insertion may be used in accordance with the present invention. Deflectable inserts may include an adhesive backing for attachment to flat plate 32 or adhesive may be applied directly on the flat plate at the predetermined locations and deflectable inserts attached to the adhesive.

Figure 3:
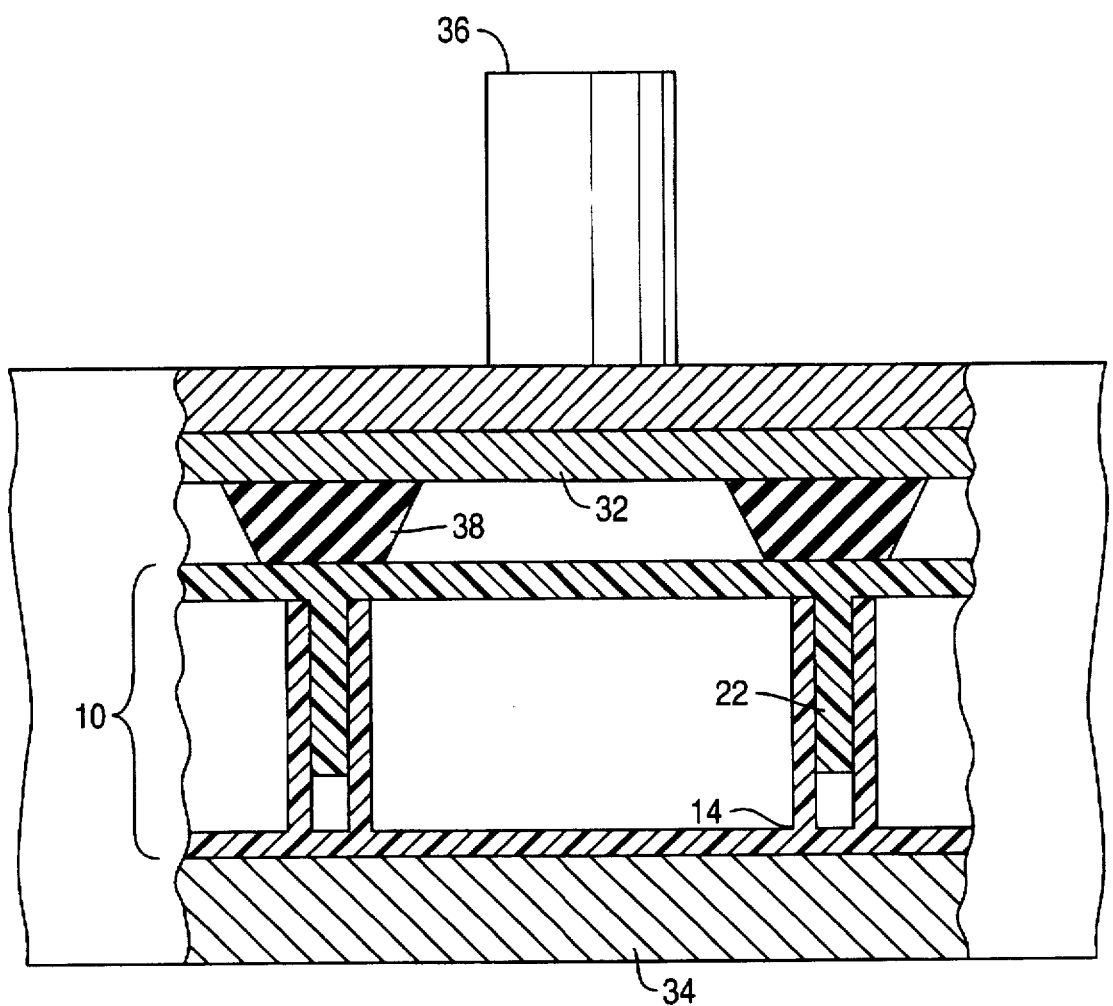
FIG. 3 shows a partial side view of the assembly press and body and cover of FIG. 2 during operation of the press.

FIG. 3 shows a partial side view, during operation of the press, of the final assembly of the preassembled part 10 which was placed on the base plate 34. The cylinders 36 of the assembly press 30 press the flat plate 32 against the cover 20 which is preassembled to the body 12 which is pressed against the base plate 34. The force of the top plate 32 is concentrated through the inserts 38 positioned at predetermined locations to force the interference fit retaining pins 22 fully into interference body shafts 14. Preferably, an insert is positioned at each retaining pin 22.

An advantage of this approach is that the body and cover are pressed fully together at each retaining pin location. The present invention causes the force of the top flat plate 32 to be concentrated at the retaining pin 22 locations rather than being spread over the whole surface of the cassette cover 20. Additionally the flexible nature of the insert selected enables compensation for slight unparalleled or deformities without leaving any pins not fully inserted or breaking any portion of the plastic part 10.

Yet another advantage of the present system and method is that a standard insert may be used at each location, with the deflection of the insert able to compensate for dimensional variations at varying retaining pin locations. The use of standard inserts saves set up time in that each insert has a common size, can be interchanged, and does not need to be sized based on the dimensions of a particular part. In contrast, the metal screws used in previous presses must be individually adjusted based on trials.

It is noted that although interference fit retaining pins 22 are shown having a cylindrical shape, tapered protrusions may be included around the cylinder to provide a more secure fit. Additionally the body shafts may have flats or a smaller diameter to provide an interference fit with the retaining pins. In general, any type of interference fit pin and hole combination may be used with the present invention.

Although the body and cover for use with the present invention have been described as having retaining pins in the cover and shafts (or holes) in the body, it is contemplated that these may be reversed or any combination on each side may be used within the scope of the present invention. The location of the deflectable inserts may need to be relocated as the orientation of the retaining pins is modified.

Although the body and cover have been shown in a ribbon cassette configuration, the invention can be used with a part having a variety of shapes, as long as the part includes at least two parts which are adjoined by interference fit retaining pins and mating body shafts.

Although the invention has been described with particular reference to certain preferred embodiments thereof, variations and modifications of the present invention can be affected within the spirit and scope of the following claims.

What is claimed is:

1. A method of assembling a part, comprising:

providing a cover having a top side and a bottom side, said bottom side of said cover having a plurality of interference fit retaining pins;

providing a body having a plurality of body shafts, each of said body shafts for receiving a corresponding interference fit retaining pin of said plurality of interference fit retaining pins;

providing a substantially flat base plate under said body;

providing a substantially flat top plate having a top side and a bottom side, said bottom side of said top plate having a plurality of deflectable inserts mounted thereon, said top plate covering said plurality of interference fit retaining pins;

applying a force to said top side of said top plate, said force being concentrated through said plurality of deflectable inserts, said force fully inserting said plurality of interference fit retaining pins into said plurality of body shafts, wherein said plurality of deflectable inserts compensate for dimensional variations by deforming after a corresponding interference fit retaining pin of said plurality of interference fit retaining pins is fully inserted into a corresponding body shaft of said plurality of body shafts; and removing said force being concentrated through said plurality of deflectable inserts from said top side of said top plate when said force has fully inserted said plurality of interference fit retaining pins into said plurality of body shafts.

2. The method of claim 1 wherein the deflectable inserts are formed of hard rubber.

3. A method of assembling a body and a cover for a ribbon cassette, comprising:

providing a cover having a top side and a bottom side, said bottom side of said cover having a plurality of interference fit retaining pins;

providing a body having a plurality of body shafts, each of said body shafts for receiving a corresponding interference fit retaining pin of said plurality of interference fit retaining pins, said body containing a ribbon;

providing a substantially flat base plate under said body;

providing a substantially flat top plate having a top side and a bottom side, said bottom side of said top plate having a plurality of deflectable inserts mounted thereon and said top plate covering said plurality of interference fit retaining pins;

applying a force to said top side of said top plate, said force being concentrated through said plurality of deflectable inserts, said force fully inserting said plurality of interference fit retaining pins into said plurality of body shafts, wherein said plurality of deflectable inserts compensate for dimensional variations by deforming after a corresponding interference fit retaining pin of said plurality of interference fit retaining pins is fully inserted into a corresponding body shaft of said plurality of body shafts, and wherein fully inserting said plurality of interference fit retaining pins into said plurality of body shafts insures that there are no gaps between said cover and said body to cause the ribbon to jam; and removing said force being concentrated through said plurality of deflectable inserts from said top side of said top plate when said force has fully inserted said plurality of interference fit retaining pins into said plurality of body shafts.

4. The method of claim 3 wherein the deflectable inserts are formed of hard rubber.

\* \* \* \* \*